United States Patent
Lo et al.

(10) Patent No.: US 12,346,732 B2
(45) Date of Patent: *Jul. 1, 2025

(54) AUTONOMOUS WAREHOUSE-SCALE COMPUTERS

(71) Applicant: Google LLC, Mountain View, CA (US)

(72) Inventors: David Lo, Palo Alto, CA (US); Liqun Cheng, Palo Alto, CA (US); Parthasarathy Ranganathan, San Jose, CA (US); Sundar Jayakumar Dev, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,526

(22) Filed: Mar. 4, 2024

(65) Prior Publication Data

US 2025/0181400 A1    Jun. 5, 2025

Related U.S. Application Data

(63) Continuation of application No. 17/150,285, filed on Jan. 15, 2021, now Pat. No. 11,960,936.

(51) Int. Cl.
*G06F 9/46* (2006.01)
*G06F 9/50* (2006.01)
*G06N 20/00* (2019.01)

(52) U.S. Cl.
CPC .......... *G06F 9/5027* (2013.01); *G06N 20/00* (2019.01)

(58) Field of Classification Search
CPC .............................. G06F 9/5027; G06N 20/00
See application file for complete search history.

(56) References Cited

U.S. PATENT DOCUMENTS

| | | |
|---|---|---|
| 2017/0109205 A1 | 4/2017 | Ahuja et al. |
| 2019/0310893 A1 | 10/2019 | Aronovich |
| 2020/0401947 A1 | 12/2020 | Jha et al. |

FOREIGN PATENT DOCUMENTS

EP    3385844 A1    10/2018

OTHER PUBLICATIONS

L. A. Barroso, U. Hölzle, and P. Ranganathan, The Datacenter as a Computer: Designing Warehouse-Scale Machines, 3rd ed. Morgan and Claypool Publishers, 2018.

(Continued)

*Primary Examiner* — Gregory A Kessler
(74) *Attorney, Agent, or Firm* — Lerner David LLP

(57) ABSTRACT

The subject matter described herein provides systems and techniques to address the challenges of growing hardware and workload heterogeneity using a Warehouse-Scale Computer (WSC) design that improves the efficiency and utilization of WSCs. The WSC design may include an abstraction layer and an efficiency layer in the software stack of the WSC. The abstraction layer and the efficiency layer may be designed to improve job scheduling, simplify resource management, and drive hardware-software co-optimization using machine learning techniques and automation in order to customize the WSC for applications at scale. The abstraction layer may embrace platform/hardware and workload diversity through greater coordination between hardware and higher layers of the WSC software stack in the WSC design. The efficiency layer may employ machine learning techniques at scale to realize hardware/software co-optimizations as a part of the autonomous WSC design.

18 Claims, 6 Drawing Sheets

(56) References Cited

OTHER PUBLICATIONS

K. Asanovic, R. Bodik, J. Demmel, T. Keaveny et al., "A view of the parallel computing landscape," Commun. ACM, vol. 52, No. 10, p. 56-67, Oct. 2009. [Online]. Available: https://doi.org/10.1145/1562764.1562783.

A. Lottarini, A. Ramirez, J. Coburn, M. A. Kim, P. Ranganathan, D. Stodolsky, and M. Wachsler, "Vbench: Benchmarking video transcoding in the cloud," in Proceedings of the Twenty-Third International Conference on Architectural Support for Programming Languages and Operating Systems, ser. ASPLOS '18. New York, NY, USA: Association for Computing Machinery, 2018, p. 797-809. [Online]. Available: https://doi.org/10.1145/3173162.3173207.

G. Ayers, J. H. Ahn, C. Kozyrakis, and P. Ranganathan, "Memory hierarchy for web search," in 2018 IEEE International Symposium on High Performance Computer Architecture (HPCA), 2018, pp. 643-656.

"401. bzip2 spec cpu2006 benchmark description." [Online]. Aug. 16, 2011. Available: https://www.spec.org/cpu2006/Docs/401.bzip2.html.

N. P. Jouppi, C. Young, N. Patil, D. Patterson et al., "In-datacenter performance analysis of a tensor processing unit," in 2017 ACM/IEEE 44th Annual International Symposium on Computer Architecture (ISCA), 2017, pp. 1-12.

Google, "Cloud TPU versions 2 and 3." [Online]. Jan. 13, 2021. Available: https://cloud.google.com/tpu/docs/system-architecture#versions.

D. Lo, L. Cheng, R. Govindaraju, L. A. Barroso, and C. Kozyrakis, "Towards energy proportionality for large-scale latency-critical workloads," in 2014 ACM/IEEE 41st International Symposium on Computer Architecture (ISCA), 2014, pp. 301-312.

V. Weaver, "perf_event programming guide." [Online]. Mar. 7, 2013. Available: http://web.eece.maine.edu/ vweaver/projects/perf_events/programming.html.

S. Kanev, J. P. Darago, K. Hazelwood, p. Ranganathan, T. Moseley, G. Wei, and D. Brooks, "Profiling a warehouse-scale computer," in 2015 ACM/IEEE 42nd Annual International Symposium on Computer Architecture (ISCA), 2015, pp. 158-169.

Wikipedia, "Occam Learning," Dec. 2, 2014. https://en.wikipedia.org/wiki/Occam_learning.

A. Sriraman, A. Dhanotia, and T. F. Wenisch, "Softsku: Optimizing server architectures for microservice diversity @scale," in 2019 ACM/IEEE 46th Annual International Symposium on Computer Architecture (ISCA), 2019, pp. 513-526.

H. Kasture, D. B. Bartolini, N. Beckmann, and D. Sanchez, "Rubik: Fast analytical power management for latency-critical systems," in 2015 48th Annual IEEE/ACM International Symposium on Microarchitecture (MICRO), 2015, pp. 598-610.

G. Prekas, M. Primorac, A. Belay, C. Kozyrakis, and E. Bugnion, "Energy proportionality and workload consolidation for latency-critical applications," in Proceedings of the Sixth ACM Symposium on Cloud Computing, ser. SoCC '15. New York, NY, USA: Association for Computing Machinery, 2015, p. 342-355. [Online]. Available: https://doi.org/10.1145/2806777.2806848.

M. E. Haque, Y. He, S. Elnikety, T. D. Nguyen, R. Bianchini, and K. S. McKinley, "Exploiting heterogeneity for tail latency and energy efficiency," in 2017 50th Annual IEEE/ACM International Symposium on Microarchitecture (MICRO), 2017, pp. 625-638.

C. Delimitrou and C. Kozyrakis, "Amdahl's law for tail latency," Commun. ACM, vol. 61, No. 8, p. 65-72, Jul. 2018. [Online]. Available: https://doi.org/10.1145/3232559.

S. Volos, D. Jevdjic, B. Falsafi, and B. Grot, "Fat caches for scale-out servers," IEEE Micro, vol. 37, No. 2, pp. 90-103, 2017.

D. Lo, L. Cheng, R. Govindaraju, P. Ranganathan, and C. Kozyrakis, "Heracles: Improving resource efficiency at scale," in 2015 ACM/IEEE 42nd Annual International Symposium on Computer Architecture (ISCA), 2015, pp. 450-462.

C. Delimitrou and C. Kozyrakis, "Qos-aware scheduling in heterogeneous datacenters with paragon," ACM Trans. Comput. Syst., vol. 31, No. 4, Dec. 2013. [Online]. Available: https://doi.org/10.1145/2556583.

Dev et al. Autonomous Warehouse-Scale Computers. Jul. 20, 2020. 2020 57th ACM/IEEE Design Automation Conference (DAC), IEEE, pp. 1-6.

Extended European Search Report for European Patent Application No. 21187199.1 dated Jan. 27, 2022. 11 pages.

AUTONOMOUS WAREHOUSE-SCALE COMPUTERS

BACKGROUND

Warehouse-Scale Computers (WSCs) power many online services considered indispensable in the contemporary world, such as web search, online shopping, email, gaming, social networking, and video streaming. These services have kept up with the exponentially increasing amount of digital data while providing more helpful and personalized services at low or no cost to users. While Moore's Law may have historically fueled the exponential increase in affordable computational capacity to sustain this growth, the slowing of Moore's Law may have created an affordability gap. This gap is being bridged by investments in hardware specialization and diversity. However, the abstractions and interfaces required to manage the resulting explosion in hardware heterogeneity have not received significant attention. Traditional WSCs have made use of black box abstractions for both hardware and software. In particular, hardware resources have been presented to software as logically homogeneous units of compute, memory, storage, and networking resources. In addition, software was represented as logically equivalent binary blobs. However, in an era where compute, memory, storage, and networking heterogeneity is increasing at a rapid rate, a new set of interfaces and abstractions are needed for WSCs to make efficient use of the hardware diversity.

BRIEF SUMMARY

A Warehouse-Scale Computer (WSC) may provide an abstraction layer, in its software stack, to hide the differences between older and newer generations of otherwise similar hardware. For example, this abstraction layer may take the form of a productivity layer in the WSC software stack that allows software to specify resource requirements that are automatically translated into appropriate units of hardware. A unit of such hardware may be a Compute Unit (CU), and the corresponding productivity layer may be a CU productivity layer. One CU may represent the amount of compute resources used to generate the same amount of compute performance for a hypothetical "average" enterprise level application, or other application with one or more workloads, across all available hardware platforms. As used herein, a workload may include one or more individual job tasks, such as those associated with the execution of a computer application, with diverse behaviors and communication patterns. In practice, defining CU as the average of many workloads may be a simplified approach and may cause a loss of information about the diversity of workloads that run in the WSC. In particular, an environment of increasing heterogeneity may exacerbate the inability of a single average number to capture an entire distribution. This may cause a WSC performance degradation and lower utilization of the WSC.

To address the challenges of growing hardware and workload heterogeneity, a new WSC design that improves the efficiency and utilization of WSCs is provided. The WSC design includes an abstraction layer and an efficiency layer in the software stack of the WSC. These layers may extend and/or replace the existing productivity layer. The abstraction layer and the efficiency layer may be designed to improve job scheduling, simplify resource management, and drive hardware-software co-optimization using machine learning techniques and automation in order to customize the WSC for applications at scale. Such an autonomous WSC design may be used to autonomously measure, monitor, and characterize diverse workloads, to identify appropriate platforms to run the workloads, and to optimize and configure the hardware to realize the best performance for these workloads. The abstraction layer may embrace platform/hardware and workload diversity through greater coordination between the hardware layer and higher layers of the WSC software stack in the WSC design. The efficiency layer may employ machine learning techniques at scale to realize hardware/software co-optimizations as a part of the autonomous WSC design.

In general, one aspect of the subject matter described in this specification includes a process for scheduling a workload to be processed on one or more computer servers. The one or more computer servers may be associated with a warehouse-scale computer (WSC). A performance profile for the workload may be generated using a first software layer. The first software layer may be a warehouse-scale computer efficiency layer, and the WSC efficiency layer may include at least one software module. The workload may be classified using a machine learning model based on the performance profile for the workload using the first software layer. A record of selected platforms for the workload may be generated using the first software layer. The machine learning model may include a hierarchical agglomerative clustering technique, and the at least one software module may include a platform ranking algorithm module that performs the hierarchical agglomerative clustering technique. The platform ranking algorithm module may optimize an objective function that includes at least one of a cost value, an efficiency value, and a performance value associated with scheduling the workload to be processed. The record of selected platforms may indicate an order of preference for each one of a set of hardware platforms of the hardware layer. The workload may be scheduled for processing on a hardware layer based on the record of preferred platforms for the workload using a second software layer, wherein the second software layer is disposed between the first software layer and the hardware layer in a software stack of the one or more computer servers. The second software layer may be a software-defined server (SDS) abstraction layer. The SDS abstraction layer may include application programming interfaces (APIs) to directly access the hardware layer.

Another aspect of the subject matter includes a system for scheduling a workload to be processed on one or more computer servers. The system may include one or more processors. A performance profile for the workload may be generated using a first software layer. The workload may be classified using a machine learning model based on the performance profile for the workload using the first software layer. A record of selected platforms for the workload may be generated using the first software layer. The workload may be scheduled for processing on a hardware layer based on the record of preferred platforms for the workload using a second software layer, wherein the second software layer is disposed between the first software layer and the hardware layer in a software stack of the one or more computer servers.

Yet another aspect of the subject matter includes a non-transitory computer-readable medium storing instructions, that when executed by one or more processors, cause the one or more processors to perform various operations. A performance profile for the workload may be generated using a first software layer. The workload may be classified using a machine learning model based on the performance profile for the workload using the first software layer. A record of selected platforms for the workload may be generated using the first software layer. The workload may be scheduled for processing on a hardware layer based on the record of preferred platforms for the workload using a second software layer, wherein the second software layer is disposed between the first software layer and the hardware layer in a software stack of the one or more computer servers.

DETAILED DESCRIPTION

A Software-Defined Server (SDS) model may address any deficiencies of existing abstraction models, which may only take into consideration limited information about WSC workloads or WSC hardware/platforms. The SDS model may extend the CU abstraction provided by the CU productivity layer by enabling higher layers of the WSC software stack to customize the CU abstraction to better match individual workload characteristics. The SDS model may also be used to redefine the hardware-software boundary and provide greater control of the underlying WSC hardware to higher layers of the WSC software stack.

Figure 1:
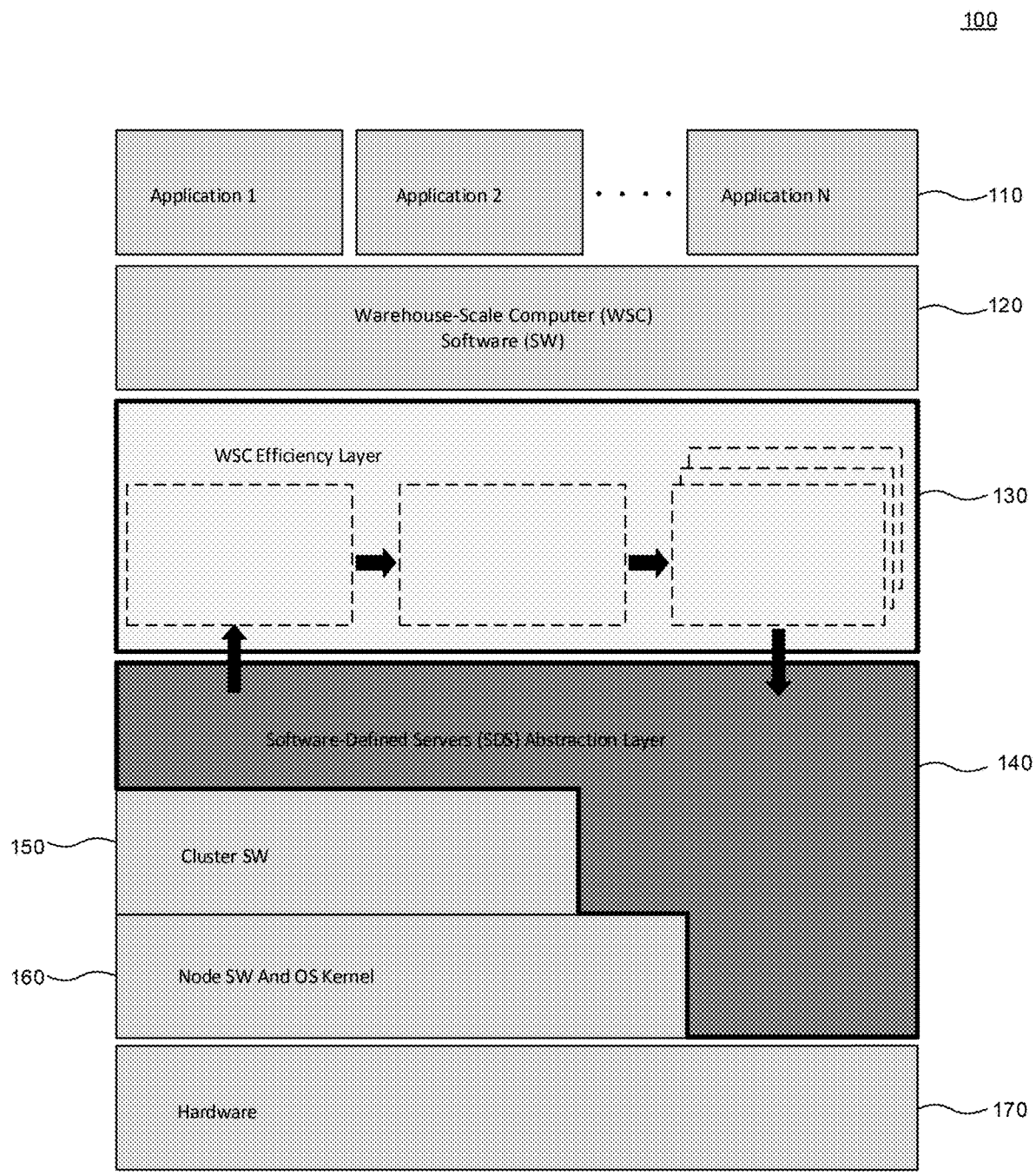
FIG. 1 is a block diagram illustrating a Warehouse Scale Computer (WSC) software stack in accordance with aspects of the disclosure.

FIG. 1 is a block diagram illustrating a Warehouse Scale Computer (WSC) software stack 100. The software stack 100 may include application layer 110, WSC software layer 120, WSC efficiency layer 130, SDS abstraction layer 140, cluster software layer 150, node software and OS kernel layer 160, and hardware layer 170. Although not pictured in FIG. 1, software stack 100 may include additional layers. Software stack 100 may also include fewer layers than those pictured in FIG. 1.

Application layer 110 may include any number of software applications. For example, application layer 110 may include applications that may be critical within an organization. As another example, application layer 110 may include applications that may be less critical. Each of these applications may be associated with one or more workloads. For example, the applications may include workload latency sensitive applications, critical workload applications, applications that have workloads that have a performance degradation tolerance, batch workload applications. As other examples, applications could include video transcoding applications, applications that have heavily multi-threaded and scale-up workloads, or applications that have single-threaded compute-bound workloads.

WSC software layer 120 may include several software components and interfaces for the seamless access for an application, such as one executing within application layer 110, to the lower layers of a WSC. The WSC software layer 120 may also include automated WSC management software components. For example, WSC software layer 120 may include resource allocation components, access control components, WSC user interface components, and the like. The WSC software layer 120 may include interfaces to communicate with the application layer 110 and/or the WSC efficiency layer 130. The WSC software layer may receive workloads from the application layer 110 and may communicate the workloads and information about the workloads to the WSC efficiency layer 130 for scheduling and processing.

Cluster software layer 150 may include software components and interfaces that receive an incoming workload from the WSC. The cluster software layer 150 may include a cluster management system that may take into account information about a workload and may determine one or more servers in each cluster of servers that may be available to process the workload, based on the workload's requirements. For example, each workload may have an associated application, and a configuration file that describes the resources that the workload may be required for it to be processed. The resources may include a number of servers, a number of cores, an amount of memory, an amount of disk space, and the like. These resources may be required by the workload to be processed. Cluster software layer 150 may take into account the requirements of each workload and the available resources of computer cluster(s), such as the cluster(s) operating in conjunction with the WSC, to schedule the workload to be processed. The cluster software layer 150 may include interfaces for communication with the node software and OS kernel layer 160, and/or SDS abstraction layer 140.

Node software and OS kernel layer 160 may include software components and interfaces that provide the overall management of each node/server(s) in each cluster of servers. Node software and OS kernel layer 160 may be used to manage storage, I/O devices, and processing devices at each node/server(s). In addition, node software and OS kernel layer 160 may route data to the appropriate servers. The node software and OS kernel layer 160 may also include interfaces for communication with the cluster software layer 150, hardware layer 170, and/or SDS abstraction layer 140.

Hardware layer 170 may include one or more hardware platforms, and their related components and related interfaces. The hardware layer 170 may include hardware platforms and components such as clusters, node/server(s), central processing unit(s) (CPUs), graphics processing unit(s) (GPUs), network interface card(s) (NICs), random access memory (RAM), storage, and the like. The hardware layer 170 may provide math, logic, and hardware control, network connectivity, short term memory, and/or long term storage. The hardware layer 170 may also include virtualizations of hardware and/or interfaces for communication with the node software and OS kernel layer 160 and/or SDS abstraction layer 140. The hardware layer 170 may interface with other layers, such as the SDS abstraction layer 140 and/or the node software and OS kernel layer 160. The hardware layer may interface with other layers via a set of application programming interfaces (APIs), which may expose the hardware platforms, components, and interfaces of the hardware layer 170 to higher layers in the WSC software stack.

WSC efficiency layer 130 may be disposed between the SDS abstraction layer 140 and the WSC software layer 120. The WSC efficiency layer 130 may use machine learning techniques/models and automated techniques to evolve the existing WSC model to a self-driving/autonomous model that can effectively handle an increasing diversity in both hardware and software in the WSC. In this manner, WSC efficiency layer 130 may enable a better matching between the WSC hardware and the WSC software. WSC efficiency layer 130 may have one or more software modules/components and/or interfaces that perform the primary functions of the WSC efficiency layer 130. For example, the WSC efficiency layer 130 may have an automated measurement and monitoring infrastructure module that may continuously monitor and collect performance metrics from workloads. Similarly, the WSC efficiency layer 130 may have a data processing pipeline module that collects performance profiles from workloads running in production. As another example, the WSC efficiency layer 130 may have a performance modeling infrastructure module that may automatically characterize workload performance on different hardware architectures. Similarly, the WSC efficiency layer 130 may have a platform ranking algorithm module that may use data-mining techniques and/or machine learning techniques/models, such as hierarchical agglomerative clustering. The platform ranking algorithm module may optimize an objective function that includes a cost value, an efficiency value, a performance value, or any combination thereof associated with scheduling the workload to be processed. The platform ranking algorithm module may use this type of clustering to cluster and rank hardware platforms for every workload, based on workload profile information. This module may also generate a sorted record of preferred/selected hardware platforms based on the hardware platform clustering and ranking. As yet another example, the WSC efficiency layer 130 may have several independent policy generators that leverage machine learning techniques/models to generate workload dependent custom configuration policies for different hardware and infrastructure level configurations. Similarly, the WSC efficiency layer 130 may include an orchestration agent module that may marshal the workload level platform preference/selection records to an online cluster management system. Although some of the foregoing modules are shown in FIG. 1, WSC efficiency layer may have different modules, additional modules, fewer modules, or multiple of the same or similar modules. The WSC efficiency layer 130 may interact closely with the SDS abstraction layer 140, which may actuate the custom configuration policies. Such a design may enable autonomous functionality, improve the performance of applications, and increase the efficiency of the WSCs.

Examples of machine learning techniques/models used by the WSC efficiency layer 130 and/or the SDS abstraction layer 140, described herein, may include linear regression models, logistic regression models, decision trees, support vector machines, Bayesian network models, kNN models, k-means models, random forest models, dimensionality reduction models, genetic algorithms, gradient boosting models, clustering models, neural networks, and the like.

SDS abstraction layer 140, may replace an existing CU productivity layer in the WSC stack. The SDS abstraction layer 140 may be disposed between hardware layer 170 and WSC efficiency layer 130. The SDS abstraction layer 140 may also be above the node software and OS kernel layer 160, and/or above the cluster software layer 150. The SDS abstraction layer 140 may include some or all of the functionality of the OS kernel layer 160, and/or above the cluster software layer 150. The SDS abstraction layer 140 may provide a stable interface to enumerate hardware capabilities, configure parameters, and monitor performance, while hiding implementation details from higher layers of the WSC software stack. The SDS abstraction layer 140 may export high-level subroutines of the WSC functionality, while the granularity of each mechanism may be surfaced up as domains. As one example, the subroutine for changing the CPU frequency of a processor, the domain of control of the CPU frequency may be per-socket on a first CPU, while it may be per-physical-core on related multi-core CPU. The SDS abstraction layer 140 may change both the hardware as well as the software of the hardware-software interface. On the hardware side of the interface, the SDS abstraction layer 140 may expose select CPU and machine level configurations as well as defined abstractions to software. The SDS abstraction layer 140 may include APIs to directly access the hardware layer 170. On the software side of the interface, the SDS abstraction layer 140 may change the cluster and node level application programming interfaces (APIs) to enable more efficient use of the underlying hardware, while preserving the transparent abstraction of the WSC for end-user applications. For example, SDS abstraction layer 140 may include an online cluster manager, also known as a cluster management system, and scheduler module. This module may use the platform preference/selection records, such as from the orchestration agent module, to appropriately schedule workloads to be processed onto their preferred hardware platforms.

The SDS abstraction layer 140 designed in this way may strike a balance between exposing everything in the hardware to higher layers of the WSC software stack and requiring the WSC software stack to handle every detail of the hardware. Exposing everything in the hardware to higher layers may unlock a lot of functionality, while requiring software to handle every detail of the hardware may introduce a high amount of complexity. Such a design may allow for the higher layers of the WSC software stack to focus on formulating policies to improve performance and efficiency without spending a large amount of time in maintaining the actuation and monitoring mechanisms for an increasingly large set of hardware devices.

The Autonomous Warehouse-Scale Computer (WSC) design described herein may build on top of the Software-Defined Server (SDS) abstraction model. Such a design may enable increased efficiencies through intelligent actions informed by characteristics of both individual workloads and hardware platforms. Such efficiencies may be realized when compared to other techniques that may treat the WSC as an "average" platform running an "average" application. As an example, critical workloads may exhibit a wide variance in key performance metrics such as query throughput and latency, compared to the expected "average" performance for each server platform used to process these workloads. This may be due to workloads having varying sensitivities to various micro-architectural features, such as within the CPUs, used by each server platform. For example, a streaming memory workload, like video transcoding may prefer a server platform with large memory bandwidth per core. As another example, a heavily multithreaded and scale-up workload, like web search may prefer either a highly simultaneous multithreaded (SMT) platform or a large core count platform. As yet another example, a single threaded compute-bound workload, like a benchmark such as the single threaded 401.bzip2 compression benchmark in SPEC CPU 2006, may show higher throughput and lower latency when running on a server with high CPU clock speed. Thus, in the foregoing examples, depending on the workload sensitivity to different micro-architectural features on the CPU, workloads may exhibit widely varying performance characteristics on the different CPU based server platforms. In some workloads, this may cause a performance delta that can be as much as 10% compared to the expected "average" performance on the best platform. In some workloads, where the "average" performance gives little information, the performance delta could be greater than 10%. Platform-aware scheduling, which may steer workloads to be processed on the platforms that enable them to realize the best performance may be used in the WSC efficiency layer 130 and in conjunction with the SDS abstraction layer to exploit the varying micro-architectural sensitivity of workloads. Such scheduling may enable the workloads to realize the best performance.

Figure 2:
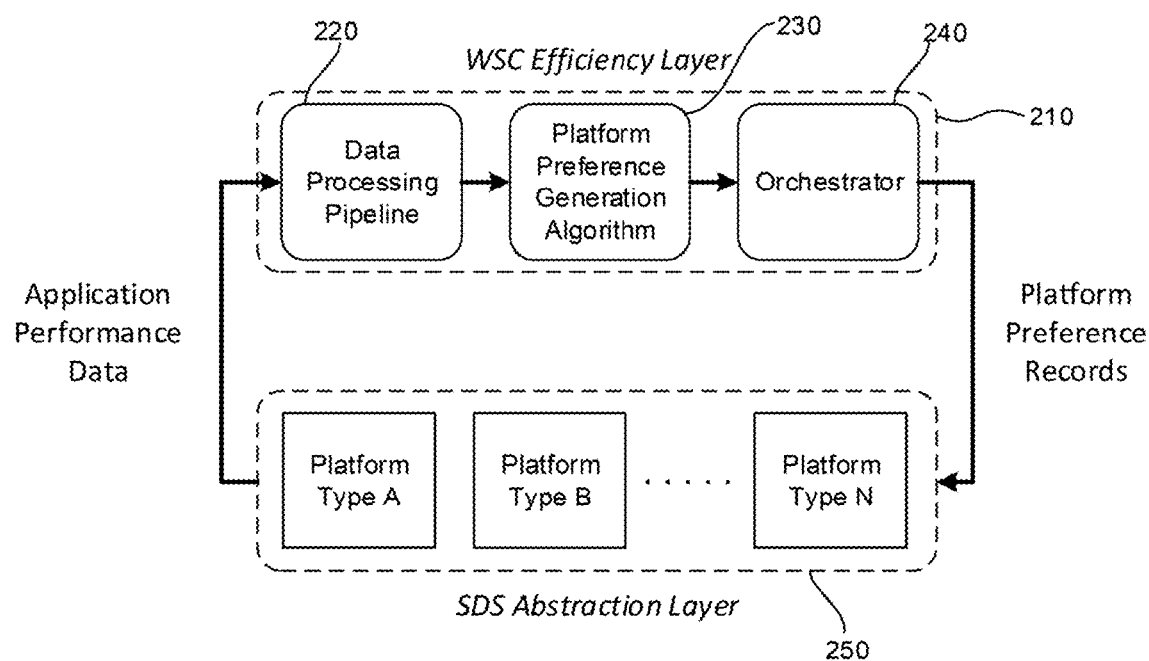
FIG. 2 is a block diagram of an example WSC efficiency layer and SDS abstraction layer of a WSC software stack that steer workloads to be processed by one or more platforms in accordance with aspects of the disclosure.

FIG. 2 is a block diagram 200 of WSC efficiency layer 210 and SDS abstraction layer 250 of a WSC software stack that steer workloads to be processed by one or more platforms. WSC efficiency layer 210 may be substantially similar in form and function to WSC efficiency layer 130 described in connection with FIG. 1. SDS abstraction layer 250 may be substantially similar in form and function to SDS abstraction layer 140 described in connection with FIG. 1. The WSC efficiency layer 210 may use machine learning techniques/models and automated techniques to steer workloads to one of N platform types via the SDS abstraction layer 250. The WSC efficiency layer 210 may implement platform-aware scheduling using one or more software modules to enable a better matching between the WSC hardware and the WSC software. For example, the WSC efficiency layer 210 may have a data processing pipeline module 220 that receives workloads from higher layers of the WSC software stack, and historical performance data of previously processed workloads from the SDS abstraction layer 250. Based on this information, the data processing pipeline module 220 may collect performance profiles from workloads running in production. As another example, the WSC efficiency layer 210 may have a platform ranking algorithm module 230 that receives workload profile information from the data processing pipeline module 220. The platform ranking algorithm module 230 may use data-mining techniques and/or machine learning techniques/models, such as hierarchical agglomerative clustering, to cluster the workload profile information. The platform ranking algorithm module 230 may optimize an objective function that includes a cost value, an efficiency value, a performance value, or any combination thereof associated with scheduling the workload to be processed. The platform ranking algorithm module 230 may also rank hardware platforms, for every workload, based on the workload profile information. The platform ranking algorithm module 230 may then generate a sorted record of preferred/selected hardware platforms.

Examples of machine learning techniques/models used by the WSC efficiency layer 210 and/or the SDS abstraction layer 250 may include linear regression models, logistic regression models, decision trees, support vector machines, Bayesian network models, kNN models, k-means models, random forest models, dimensionality reduction models, genetic algorithms, gradient boosting models, clustering models, neural networks, and the like. As yet another example, the WSC efficiency layer 210 may include an orchestration agent module 240 that may receive the sorted record of preferred/selected hardware platforms. The orchestration agent module 240 may marshal the workload level platform preference/selection records to the online cluster management system. The WSC efficiency layer 210 may interact closely with the SDS abstraction layer 250.

The SDS abstraction layer 250 may include an online cluster manager, also known as a cluster management system, and scheduler module which may use the platform preference/selection records, such as from the orchestration agent module 240, to appropriately schedule workloads to be processed onto their preferred hardware platforms. For example, as shown in block diagram 200, workloads may be steered or routed by SDS abstraction layer 250 to one of N platform types to be processed by the associated hardware platforms. The SDS abstraction layer 250 may use machine learning techniques/models along with the platform preference selection records, and/or platform availability information to appropriately match workloads to hardware platforms for the processing of the workloads. The SDS abstraction layer 250 may collect performance data for the workload(s) that it schedules on a hardware platform and may communicate, as feedback, this data with data processing pipeline 220 in the WSC efficiency layer 210. Such a design may enable autonomous functionality, improve the performance of applications, and increase the efficiency of the WSCs.

Figure 3:
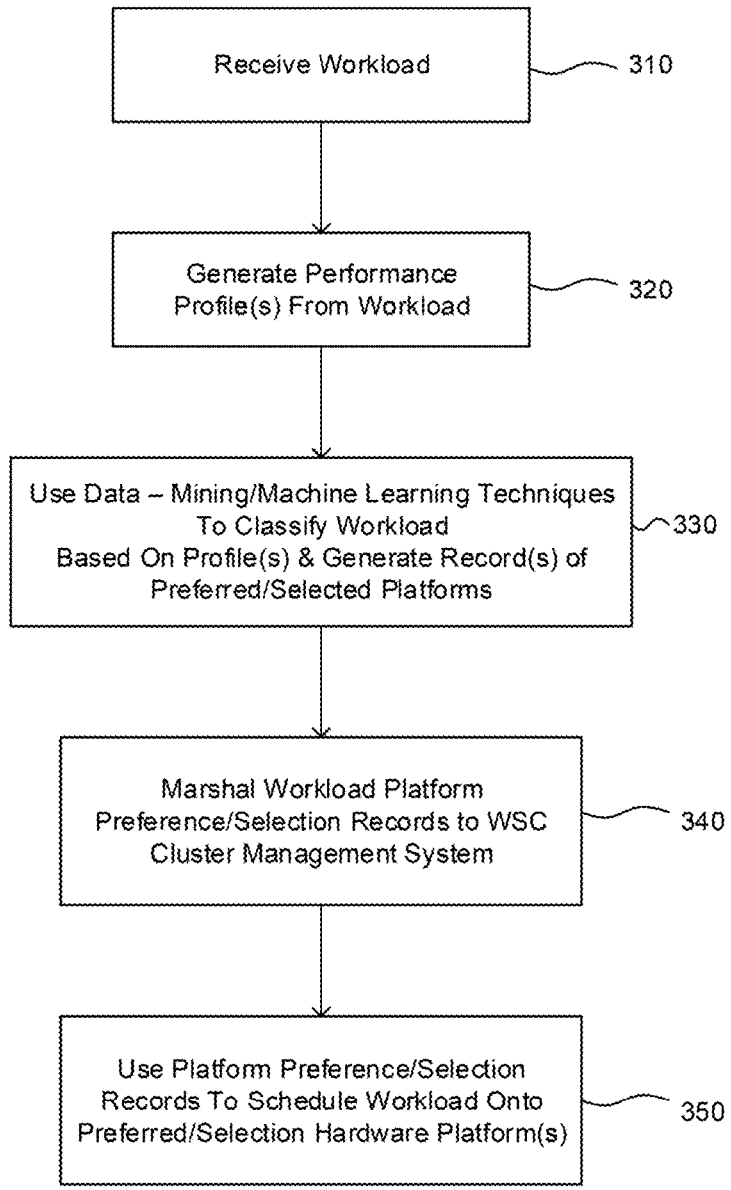
FIG. 3 is a flow diagram of an example process for scheduling a workload to be processed on one or more hardware platforms of the WSC in accordance with aspects of the disclosure.

FIG. 3 is a flow diagram of example process 300 for scheduling a workload to be processed on one or more hardware platforms of the WSC. The process 300 may be performed, by way of example, by the software and hardware described in connection with FIG. 1, FIG. 6A, and FIG. 6B. Each of the operations of process 300 may be shown as a block of FIG. 3.

In block 310, a workload may be received for processing by the WSC. For example, a workload may be received by the WSC efficiency layer 210 of FIG. 2, from a higher layer, in connection with an application requiring the workload to be processed.

In block 320, one or more performance profiles may be generated from the workload and from historical performance data of previously processed workloads from the SDS abstraction layer. For example, the performance profile may include information about workload performance on various hardware platforms, a history of such performance, internal activity of the workload including any significant events or activity if the workload is processed, workload requirements, resources required or used by the workload, metrics and benchmarks associated with the workload, raw data about the dynamic behavior of the workload, general statistics regarding the workload, workload traces, execution times of the workload, variability in the workload, or other such information about the workload. The performance profile(s) may be generated, for example, by the data processing pipeline module 220 of FIG. 2.

In block 330, data-mining techniques and/or machine learning techniques/models, such as hierarchical agglomerative clustering, may be used on the workload profile information to cluster the workload profile information. An objective function that includes a cost value, an efficiency value, a performance value, or any combination thereof associated with scheduling the workload to be processed may be optimized. In addition, the hardware platforms may be ranked for every workload and a record of preferred/selected hardware platforms may be generated. The record of preferred/selected hardware platforms may be sorted. Examples of other data-mining techniques and/or machine learning techniques/models that may be used on the workload profile information and workloads may include: linear regression models, logistic regression models, decision trees, support vector machines, Bayesian network models, kNN models, k-means models, random forest models, dimensionality reduction models, genetic algorithms, gradient boosting models, clustering models, neural networks, and the like. Such techniques may be used to categorize/classify the workloads and to determine the best hardware platforms suited for processing the workload. Particular hardware platforms may be indicated to be preferred or selected for processing the workload based on the clustering and/or categorization of the workloads. The preference or selection of a particular hardware platform for a workload may depend on the resources of that platform and/or the availability of that platform to process the workload. The particular hardware preferred/selected hardware platforms for a workload may be ranked or organized in a sorted record. For example, the record may indicate an order of preference for each one of a set of hardware platforms to process the workload. As another example, the record may indicate an order of preference for groups of a set of hardware platforms to process the workload. The ordering may indicate hardware platforms by most to least preferred, or by least to most preferred. The record of preferred/selected hardware platforms may be generated, for example, by the platform ranking algorithm module 230 of FIG. 2.

In block 340, workload platform preference/selection records may be marshaled to a cluster management system. For example, the platform preferences/selections in the record generated in block 330 may be arranged for consumption by the SDS abstraction layer. If it is necessary, alterations of the platform preference/selection records may be made such as the addition of hardware platforms, reordering of hardware platforms, or the deletion of hardware platforms. The resulting records may be provided as input to an interface used to communicate with the SDS abstraction layer. The platform preference/selection records may be transformed into a data format suitable for the SDS abstraction layer. For example, the preference/selection records that were generated by platform ranking algorithm module 230 described in connection with FIG. 2 may be arranged and transformed by the orchestration agent module 240 of FIG. 2. The arrangement and transformation of the records may be into, for example, data to be operated on by a cluster management system module, which may be a part of the SDS abstraction layer 250 of FIG. 2.

In block 350, the platform preferences/selection records may be used to schedule the associated workload onto the preferred/selected hardware platform(s) to process the workload. For example, the workload may be processed by one or more platforms ranked as being the most preferred in the platform preferences/selection record. This may, for example, be one or more platforms at the top of the sorted record of platform preferences/selections. As another example, the workload may be processed by a platform ranked as being the second most preferred or ranked highly in the platform preferences/selection record. This may occur, for example, if the most preferred platform(s) are unavailable or being used to process other workload(s). The scheduling of a workload in this manner may be done, for example, by an online cluster manager, also known as a cluster management system, and scheduler module of the SDS abstraction layer 250 of FIG. 2. The scheduling of the workload in this manner may instead be done directly by SDS abstraction layer 250 of FIG. 2. Performance data for workloads previously scheduled in this manner on any hardware platform may be collected and communicated. For example, SDS abstraction layer 250 of FIG. 2 may collect this data and data processing pipeline 220 in the WSC efficiency layer 210 of FIG. 2 may receive this data.

Although various blocks, algorithms, or the like may be described or claimed in a particular sequential order, such processes may be configured to work in different orders. In other words, any sequence or order of operations that may be explicitly described or claimed does not necessarily indicate a requirement that the operations be performed in that order. The operations of processes described herein may be performed in any order possible, and operations may be added or omitted.

Although a process may be described as including a plurality of operations, that does not imply that all or any of the operations are preferred, essential or required. Various other implementations may include other processes that omit some or all of the described operations. Although a process may be described singly or without reference to other products or processes, in some examples the process may interact with other products or processes. Such interaction may be provided to enhance the flexibility or desirability of the process.

Scheduling workloads onto appropriate platforms based on their architectural and micro-architectural affinities, as described above, may generally be applicable to accelerator and graphics processing unit (GPU) based platforms as well. For example, in addition to general purpose CPU based servers, different types of accelerators and GPU based servers may be deployed in production. These may include the many generations of Tensor Processing Unit (TPU) based machine learning accelerator platforms, like TPUv1, TPUv2, TPUv3 and Edge TPU, as well as several generations of GPU based servers. Each successive generation of an accelerator or GPU may differ from the previous generation at the micro architectural level similar to successive generations of CPUs. Correspondingly, accelerator and GPU bound workloads may also exhibit varying sensitivities to these micro-architectural differences. This heterogeneity in accelerators/GPUs and their workloads may provide for an opportunity to extend platform-aware scheduling to also target accelerator and GPU based platforms. In particular, using platform-aware scheduling may improve the efficiency and utilization of accelerators and GPUs by flexibly scheduling workloads onto the most appropriate generation of an accelerator or GPU family. In addition, using platform-aware scheduling may provide a mechanism to handle the increasing hardware heterogeneity within an accelerator or GPU family, without burdening and exposing the end users to the underlying platform differences. Such use of platform-aware scheduling may result in at least a 7-10% average throughput improvement. Such improvement may be as measured using the metric of a million instructions retired per second per a compute unit, such as MIPS/CU. The measurement may be made, for example, across six or more different WSC clusters. This metric may also be used as performance value to be optimized by an objective function, such as that used by the WSC efficiency layer as described herein. In some examples, platform-aware scheduling for accelerators and GPUs may improve the utilization of some accelerator and GPU platforms by up to two times.

Implementing the platform-aware scheduling feature in the WSC efficiency layer, as described herein, can lead to several improvements over the current state of the art. With increasing workload diversity, the latest and greatest hardware platform generation may not always be the most efficient platform for many workloads. This, combined with the increasing diversity in hardware platforms, can present an opportunity to improve workload performance by better matching workloads to hardware platforms. This can be exploited by implementing features like platform-aware scheduling in the WSC efficiency layer. Better matching workloads to hardware platforms, as described herein, can lead to improved and more efficient workload performance, better utilization of the WSC, and a reduction in toil in maintaining WSCs at scale.

Figure 4:
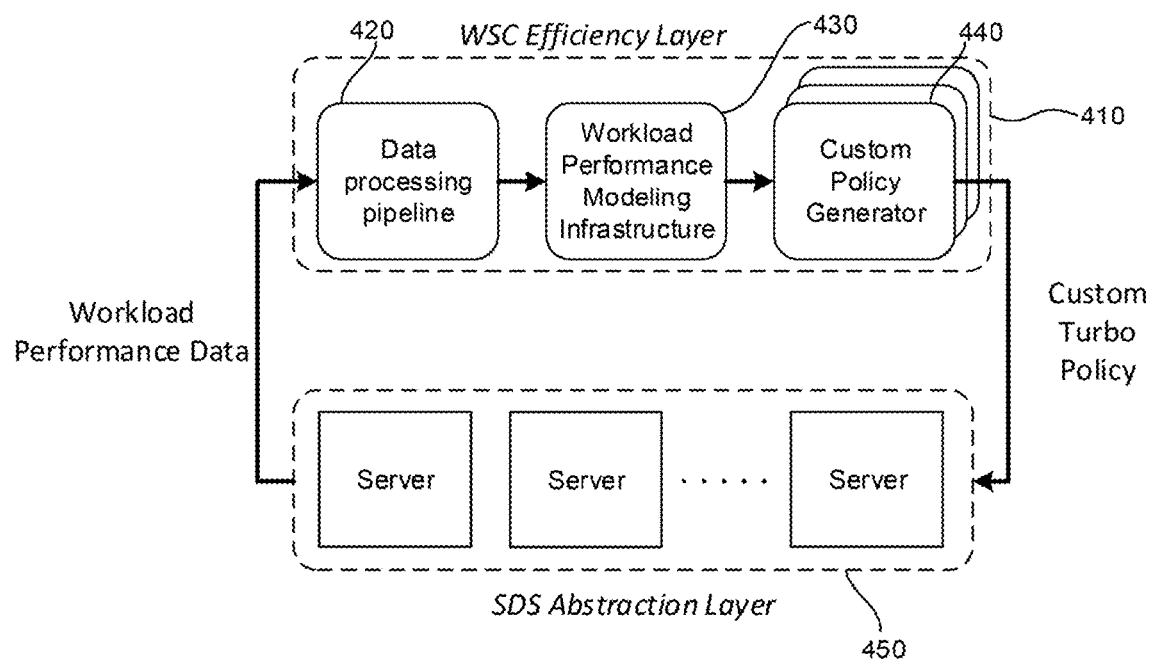
FIG. 4 is a block diagram of an example WSC efficiency layer and SDS abstraction layer of a WSC software stack that steer workloads to be processed by a custom hardware and/or infrastructure configuration in accordance with aspects of the disclosure.

FIG. 4 is a block diagram 400 of WSC efficiency layer 410 and SDS abstraction layer 450 of a WSC software stack that steer workloads to be processed by a custom hardware and/or infrastructure configuration. WSC efficiency layer 410 may be substantially similar in form and function to WSC efficiency layer 130 described in connection with FIG. 1. SDS abstraction layer 450 may be substantially similar in form and function to SDS abstraction layer 140 described in connection with FIG. 1.

The WSC efficiency layer 410 may implement platform-aware scheduling using one or more software modules to enable a better matching between the WSC hardware and the WSC software. For example, the WSC efficiency layer 410 may have a data processing pipeline module 420 that receives workloads from higher layers of the WSC software stack, and historical performance data of previous processed workloads from the SDS abstraction layer 450, and collects performance profiles from workloads running in production. As another example, the WSC efficiency layer 410 may have a performance modeling infrastructure module 430 that receives workload profile information from the data processing pipeline module 420. The performance modeling infrastructure module 430 may use offline data-mining techniques and/or machine learning techniques/models, such as hierarchical agglomerative clustering, to cluster the workload profile information, along with profiles for other workloads, for use in determining performance characteristics of mixtures of workloads. The performance modeling infrastructure module 430 may optimize an objective function that includes a cost value, an efficiency value, a performance value, or any combination thereof associated with the workload to be processed. The resulting information may be used to determine a hardware configuration on one or more hardware platforms that are best suited to process the workload. The workload may be processed as a mixture of other workloads that are being processed by the same hardware platform(s).

Examples of data-mining techniques and/or machine learning techniques/models used by the WSC efficiency layer 410 and/or the SDS abstraction layer 450 may include: linear regression models, logistic regression models, decision trees, support vector machines, Bayesian network models, kNN models, k-means models, random forest models, dimensionality reduction models, genetic algorithms, gradient boosting models, clustering models, neural networks, and the like. As yet another example, the WSC efficiency layer 410 may include one or more custom policy generators 440 that may receive the performance characteristics of workload mixtures. One or more of the policy generators 440 may generate custom hardware platform configuration policies for each workload mix and thus for each workload. For example, if a hardware platform included a central processing unit (CPU), the hardware configuration policy generated by the one or more policy generators 440 may be a turbo control mechanism setting for the CPU. The hardware configuration policy may be based on the workloads being processed by the WSC. For example, the one or more policy generators 440 may leverage an existing CPU Turbo Boost control mechanism named PEGASUS, which stands for Power and Energy Gains Automatically Saved from Underutilized Systems. PEGASUS may make it possible to trade a higher CPU performance for a reduced CPU power consumption using CPU Turbo Boost policy controls. Specifically, the one or more policy generators 440 may generate custom CPU Turbo Boost policies using PEGASUS for each workload mix.

The WSC efficiency layer 410 may interact closely with the SDS abstraction layer 450. As such, the SDS abstraction layer 450 may configure hardware platform(s), such as one or more servers, based on the policies generated by the one or more policy generators 440. In the above PEGASUS example, the custom CPU Turbo Boost policies generated by the one or more policy generators 440 may be configured on the CPU(s) of a hardware platform by the SDS abstraction layer 450. Additionally, SDS abstraction layer 450 may monitor and provide feedback data regarding the historical performance of the workload and/or workload mix on the hardware platform(s) to the WSC efficiency layer 410 via, e.g., the data processing pipeline module 420. This feeding back of performance data may allow for a control loop that allows the WSC efficiency layer 410 and the SDS abstraction layer 450 to make continuous adjustments to the hardware platform(s). The continuous adjustments may improve workload processing performance.

By dynamically adjusting the CPU Turbo Boost values based on the performance distribution of heterogeneous workloads, multiple benefits may be realized. For example, changes in workload mix may be automatically ascertained. This may ensure that the control policy remains up to date with changing workload characteristics. As another example, through constant iteration, the Turbo Boost policy may converge to an optimal policy over time, thus decreasing the sensitivity to hyper-parameters used in the policy update algorithm. This dynamic CPU Turbo Boost feature may be deployed in all WSCs. Such a feature may result in a consistent and predictable performance. For example, performance variation for critical workloads may be reduced by a significant amount, such as 25%, when compared to the static policy generated for the "average" workload.

Generally, such a design for the WSC efficiency layer 410 and the SDS abstraction layer 450 may enable autonomous functionality, improve the performance of applications, and increase the efficiency of the WSCs. In particular, the WSC efficiency layer 410 may be used to customize and co-optimize hardware configurations to best fit heterogeneous workload characteristics. Such dynamic runtime reconfiguration of hardware platforms may allow for maximizing the performance for heterogeneous mixtures of workloads. Additionally, such dynamic runtime reconfiguration of the hardware platforms may provide flexibility to dynamically re-purpose a general purpose hardware platform for different workloads during runtime. Such re-purposing may lead to improved utilization of the hardware platforms.

Figure 5:
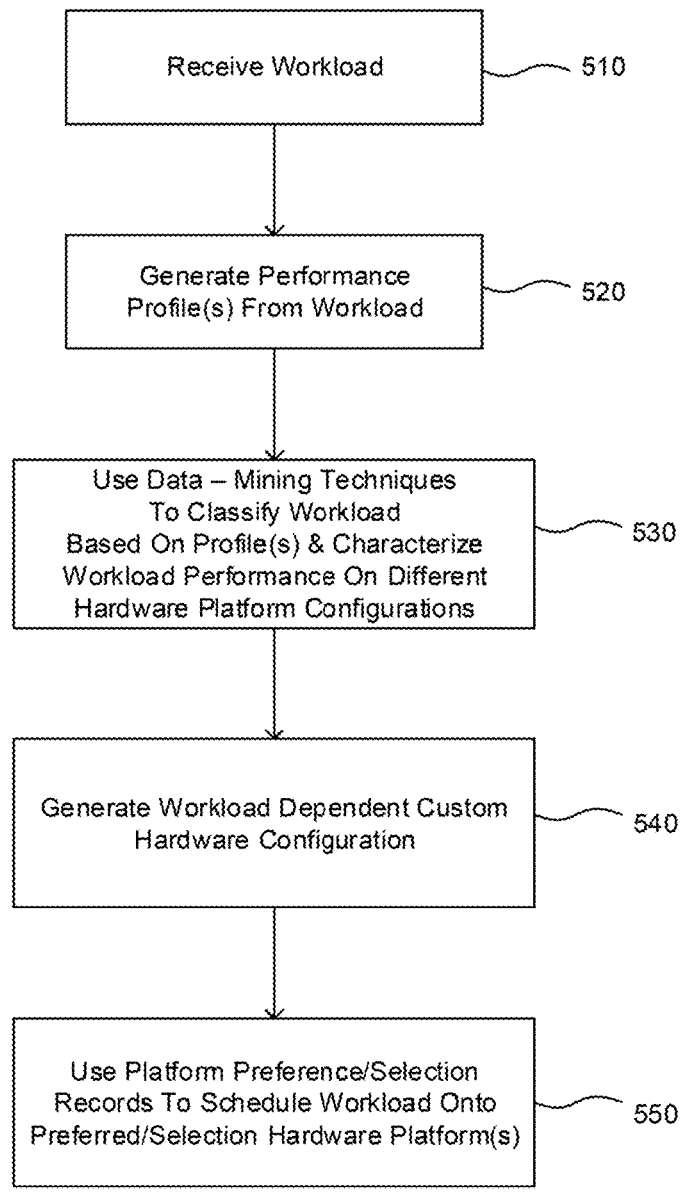
FIG. 5 is a flow diagram of an example process for scheduling a workload to be processed by a custom hardware and/or infrastructure configuration in a WSC in accordance with aspects of the disclosure.

FIG. 5 is a flow diagram of example process 500 for scheduling a workload to be processed on one or more hardware platforms of the WSC. The process 500 may be performed, by way of example only, by the software and hardware described in connection with FIG. 1, FIG. 6A, and FIG. 6B. Each of the operations of process 500 may be shown as a block of FIG. 5.

In block 510, a workload may be received for processing by the WSC. For example, a workload may be received by the WSC efficiency layer 410, from a higher layer, in connection with an application requiring the workload to be processed.

In block 520, one or more performance profiles may be generated from the workload and from historical performance data of previously processed workloads from the SDS abstraction layer. For example, the performance profile may include information about workload performance on various hardware platforms and hardware configurations, possibly in conjunction with other workloads. The performance profile may also include information about a history of such performance, internal activity of the workload including any significant events or activity if the workload is processed, workload requirements, resources required or used by the workload, metrics and benchmarks associated with the workload, raw data about the dynamic behavior of the workload, general statistics regarding the workload, workload traces, execution times of the workload, variability in the workload, or other such information about the workload. The performance profile(s) may be generated, for example, by the data processing pipeline module 420 of FIG. 4.

In block 530, data-mining techniques and/or machine learning techniques/models, such as hierarchical agglomerative clustering, may be used on the workload profile information to cluster the workload profile information, along with profiles for other workloads. Such clustering may be used in determining performance characteristics of a mixture of workloads. An objective function that includes a cost value, an efficiency value, a performance value, or any combination thereof associated with the workload to be processed may be optimized. Examples of other data-mining techniques and/or machine learning techniques/models that may be used on the workload profile information and workloads may include: linear regression models, logistic regression models, decision trees, support vector machines, Bayesian network models, kNN models, k-means models, random forest models, dimensionality reduction models, genetic algorithms, gradient boosting models, clustering models, neural networks, and the like. Such techniques may be used to categorize/classify the workloads and to determine a hardware configuration on one or more hardware platforms that is best suited to process the workload. The workload may be processed along with a mixture of other workloads that are being processed by the same hardware platform(s). The performance characteristics of workload mixtures may be generated, for example, by the performance modeling infrastructure module 430 of FIG. 4.

In block 540, custom hardware platform configuration policies may be generated for each workload mix and thus for each workload. Such policies may be generated based on the performance characteristic of workload mixtures determined in block 530. For example, if a hardware platform included a central processing unit (CPU), the hardware configuration policy generated may be a turbo control mechanism setting for the CPU based on the workloads being processed by the WSC. The resulting hardware configuration policies may be provided as input to an interface used to communicate with the SDS abstraction layer. The policies may be transformed into a data format suitable for the SDS abstraction layer. For example, the information pertaining to performance characteristics of mixtures of workloads generated by the performance modeling infrastructure module 430 described in connection with FIG. 4 may be used to generate custom hardware platform configuration policies by the one or more policy generators 440 of FIG. 4. The policies may be provided to the SDS abstraction layer 450 of FIG. 4 to implement the policies on the associated hardware platform(s).

In block 550, custom hardware platform configuration policies may be actuated on the hardware platform(s). For example, the hardware platform(s), such as one or more servers, may be configured based on the policies generated. Data such as the historical performance of a workload and/or workload mix on the custom configured hardware platform(s) may be monitored and fed back. The actuation of the custom hardware policies on hardware platform(s) may be performed by the SDS abstraction layer 450 of FIG. 4. The workload and/or workload mix performance data may be monitored and communicated as feedback to the WSC efficiency layer 410 of FIG. 4 by the SDS abstraction layer 450 of FIG. 4. The feeding back of performance data may allow for a control loop that allows the WSC efficiency layer 410 of FIG. 4 and the SDS abstraction layer 450 of FIG. 4 make continuous adjustments to the hardware platform(s) to improve workload processing performance.

Although various blocks, algorithms, or the like may be described or claimed in a particular sequential order, such processes may be configured to work in different orders. In other words, any sequence or order of operations that may be explicitly described or claimed does not necessarily indicate a requirement that the operations be performed in that order. The operations of processes described herein may be performed in any order possible, and operations may be added or omitted.

Although a process may be described as including a plurality of operations, that does not imply that all or any of the operations are preferred, essential or required. Various other implementations may include other processes that omit some or all of the described operations. Although a process may be described singly or without reference to other products or processes, in some examples the process may interact with other products or processes. Such interaction may be provided to enhance the flexibility or desirability of the process.

As WSC designs evolve to support diverse workloads and heterogeneous hardware platforms, enabling more autonomy and self-driving capabilities in all of the layers of the WSC software stack, they may also increase the performance and efficiency of workloads. In addition, enabling such autonomy and self-driving capabilities in the WSC better utilize the WSC and can reduce the toil in maintaining WSCs at scale.

Designing and deploying autonomous WSCs may bring several challenges. For example, the Linux kernel provides access to the perf_events interface through which the hardware performance counters for a workload may be accessed. These perf_events may provide invaluable insights into workload characteristics and serve as training data for building machine learning techniques/models. Additionally, perf_events may also enable the ability to close the control loop in an autonomous system by providing feedback on the results from an intended change to the system. To have good perf_events, the following may be useful: (a) the hardware level support to enable efficient collection of these events for every workload running on a machine; and (b) the infrastructure level support to collect and store these events at WSC scale. These challenges may be addressed by infrastructure that collects both application level performance signals through periodic profiling and micro-architecture level perf_events through sampling.

As another example, when individual teams design and deploy the various autonomous WSC features in production, often there may be a situation where some features conflict with others. Such a situation may lower the overall efficiency of the WSC. To address this challenge, a common metric, or a combination of metrics, may be defined that can be used as the optimization target(s) by all the projects. As examples, Queries Per Second (QPS), Query Latency, Million Instructions Per Second (MIPS), Throughput/$, Throughput/Watt, Throughput/Normalized-Compute-Resource, and the like may be used as possible metrics. When picking one or more metrics consideration may be given as to whether the metric(s) can holistically capture both the end user performance as well as the impact of various hardware resource dimensions on the end user performance. Regardless of the choice of metric(s), the full WSC software stack may use these common metrics as a primary optimization target, and to use all others as secondary targets.

As yet another example, every WSC cluster may be unique and may run a unique mix of applications and their associated workloads. Hence, it may be challenging to find two WSC clusters with similar workloads and hardware platform characteristics to perform A/B experiments when introducing a new feature in the WSC software stack. To address this challenge, a high-fidelity WSC scheduler simulator may be used. Such a scheduler and simulator may be able to take the checkpoint file representing the state of a real WSC cluster and run the cluster scheduling algorithm on the workloads in the checkpoint similar to the real production scheduler. This WSC scheduler and simulator may be used to estimate the potential benefit before introducing a new feature in the cluster scheduling layer of the WSC stack. This scheduler and simulator may also serve as the control group to generate baseline results for comparison after the new feature is enabled in production. Having such a high-fidelity scheduler and simulator may also enable safe experimentation and quick iteration when introducing new features in the WSC software stack.

As yet another example, when machine learning based solutions become deployed in WSC production environments, a challenge faced by engineering teams may be debugging and understanding of the machine learning algorithm outputs that may cause production outages. In order to address this challenge, feature development teams may balance simplicity and debug-ability versus complexity and accuracy of machine learning models deployed in production. For such situations, the Occam Learning principle may be used. In particular, the simplest machine learning model may be used initially and more complex models may be iteratively built up to meet the service level objectives.

As another example, as autonomous systems become deployed in production environments, it may be a challenge to address reliability and serviceability of these systems to avoid lengthy production outages. To address this challenge, feature development teams should consider reliability as a "first class citizen" from inception and plan and build systems that can function reliably at scale.

Figure 6A:
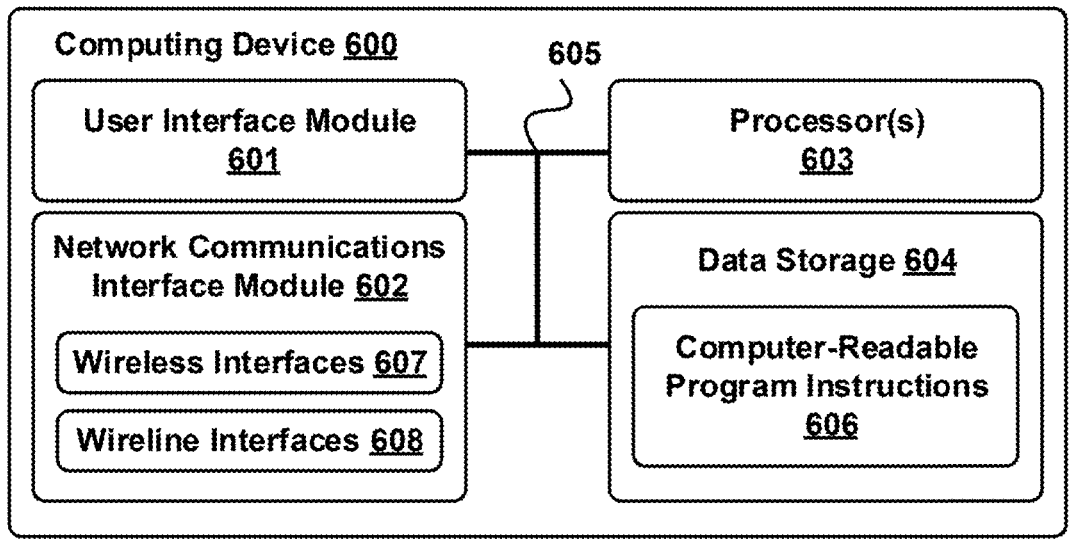
FIG. 6A illustrates an example computing device in accordance with aspects of the disclosure.

FIG. 6A is a block diagram of a computing device 600. The computing device 600 may include a user interface module 601, a network-communication interface module 602, one or more central processing units (CPUs) 603, and data storage 604, all of which may be linked together via a system bus, network, or other connection mechanism 605. The computing device 600 may be any type of device that can receive data and provide information for display in association with the received data. Computing device 600 could also take the form of or be included in an integrated server system. Further, computing device 600 may be at least a portion of a hardware platform on which at least a portion of WSC software stack operates. Computing device 600 may take other forms and/or be included as part of other systems. Computing device 600 may include part or all of other systems as well. For example, the device 600 may include all or some of WSC software stack 100 described in connection with FIG. 1 and/or the WSC efficiency layer and/or SDS abstraction layer described in connection with FIGS. 2, 3, 4 and 5. In addition, computing device 600 may be a portion of a WSC and/or associated hardware platform such as what is described herein.

The user interface module 601 may be operable to send data to and/or receive data from external user input/output devices. For example, the user interface module 601 may be configured to send/receive data to/from user input devices such as a keyboard, a keypad, a touch screen, a computer mouse, a track ball, a joystick, and/or other similar devices, now known or later developed. The user interface module 601 may also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 601 may also be configured to generate audible output(s), such as a speaker, speaker jack, audio output port, audio output device, earphones, and/or other similar devices, now known or later developed.

The network-communications interface module 602 may include one or more wireless interfaces 607 and/or wireline interfaces 608 that may be configurable to communicate via a network. The wireless interfaces 607 may include one or more wireless transceivers, such as a Bluetooth transceiver, a Wi-Fi transceiver perhaps operating in accordance with an IEEE 802.11 standard (e.g., 802.11A, 802.11B, 802.11g), a WiMAX transceiver perhaps operating in accordance with an IEEE 802.16 standard, and/or other types of wireless transceivers configurable to communicate via a wireless network. The wireline interfaces 608 may include one or more wireline transceivers, such as an Ethernet transceiver, a Universal Serial Bus (USB) transceiver, or similar transceiver configurable to communicate via a wire, a twisted pair of wires, a coaxial cable, an optical link, a fiber-optic link, or other physical connection to a wireline network.

In some examples, the network communications interface module 602 may be configured to provide reliable, secured, compressed, and/or authenticated communications. For each communication described herein, information for ensuring reliable communications (e.g., guaranteed message delivery) may be provided, perhaps as part of a message header and/or footer. For example, packet/message sequencing information, encapsulation header(s) and/or footer(s), size/time information, and transmission verification information such as cyclic redundancy check (CRC) and/or parity check values information pay be provided. Communications may be compressed and decompressed using one or more compression and/or decompression algorithms and/or protocols such as, but not limited to, one or more lossless data compression algorithms and/or one or more lossy data compression algorithms. Communications may be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms may be used as well or in addition to those listed herein to secure (and then decrypt/decode) communications.

The one or more CPUs 603 may include one or more general purpose processors and/or one or more special purpose processors (e.g., digital signal processors, application specific integrated circuits, etc.). The one or more processors 603 may be configured to execute computer-readable program instructions 606 that may be contained in the data storage 604 and/or other instructions as described herein.

The data storage 604 may include one or more computer-readable storage media that may be read or accessed by at least one of the processors 603. The one or more computer-readable storage media can include volatile and/or non-volatile storage components, such as optical, magnetic, organic or other memory or disc storage, which can be integrated in whole or in part with at least one of the one or more processors 603. In some examples, the data storage 604 may be implemented using a single physical device (e.g., one optical, magnetic, organic or other memory or disc storage unit), while in other examples, the data storage 604 may be implemented using two or more physical devices.

Computer-readable storage media associated with data storage 604 and/or other computer-readable media described herein may also include non-transitory computer-readable media such as computer-readable media that stores data for short periods of time like register memory, processor cache, and random access memory (RAM). Computer-readable storage media associated with data storage 604 and/or other computer-readable media described herein may also include non-transitory computer readable media that stores program code and/or data for longer periods of time, such as secondary or persistent long term storage, like read only memory (ROM), optical or magnetic disks, compact-disc read only memory (CD-ROM), for example. Computer-readable storage media associated with data storage 604 and/or other computer-readable media described herein may also be any other volatile or non-volatile storage systems. Computer-readable storage media associated with data storage 604 and/or other computer-readable media described herein may be considered computer readable storage media for example, or a tangible storage device.

The data storage 604 may include computer-readable program instructions 606 and perhaps additional data. In some examples, the data storage 604 may additionally include storage required to perform at least part of the herein-described processes/techniques/methods, and/or at least part of the functionality of the herein-described systems.

Figure 6B:
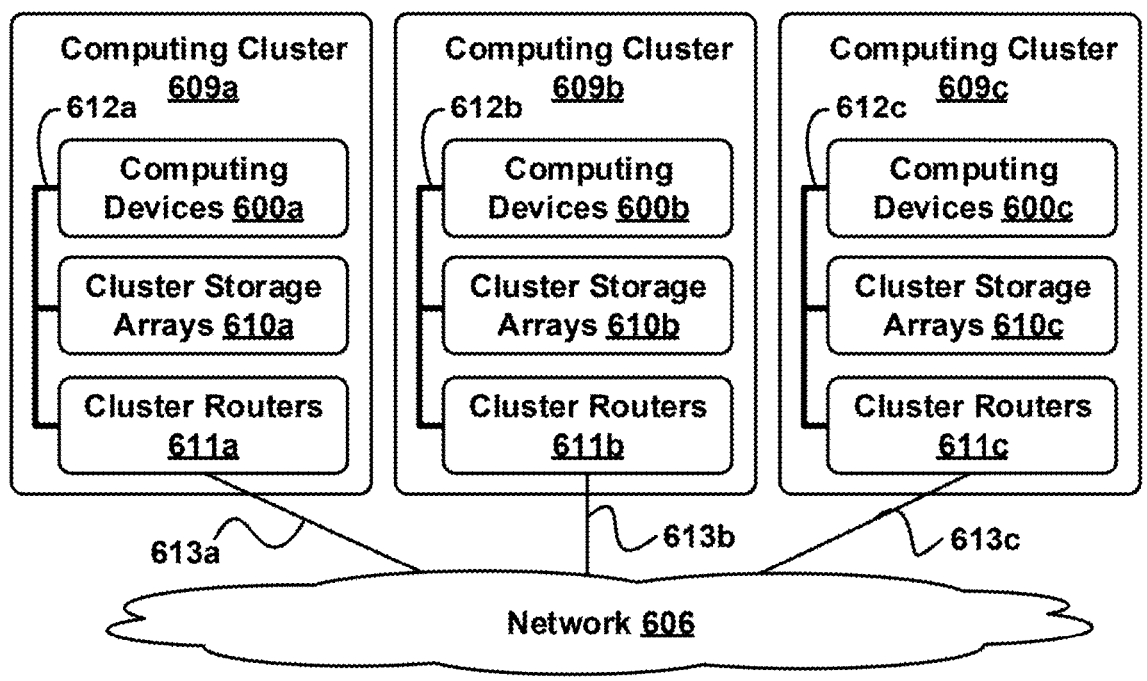
FIG. 6B is a block diagram of a network with computing clusters of a WSC in accordance with aspects of the disclosure.

FIG. 6B is a block diagram of a network with computing clusters 609a, 609b, and 609c of a WSC in accordance with some examples. Computing clusters 609a, 609b, and 609c may each include one or more hardware platforms, such as one or more computing devices 600a, 600b, and/or 600c. The one or more computing devices 600a, 600b, and/or 600c may each be one or more computer servers and may each include aspects, in whole or in part, of the computing device 600. Computing clusters 609a, 609b, and 609c may be connected by a network 606. In FIG. 6B, functions of a WSC, may be distributed among three computing clusters 609a, 609b, and 608c. The computing cluster 609a may include one or more computing devices 600a, cluster storage arrays 610a, and cluster routers 611A, connected together by local cluster network 612a. Similarly, computing cluster 609b may include one or more computing devices 600b, cluster storage arrays 610b, and cluster routers 611B, connected together by local cluster network 612b. Likewise, computing cluster 609c may include one or more computing devices 600c, cluster storage arrays 610c, and cluster routers 611C, connected together by a local cluster network 612c.

In some examples, each of computing clusters 609a, 609b, and 609c may have an equal number of computing devices, an equal number of cluster storage arrays, and an equal number of cluster routers. In some examples, some or all of computing clusters 609a, 609b, and 609c may have different numbers of computing devices, different numbers of cluster storage arrays, and/or different numbers of cluster routers. The number of computing devices, cluster storage arrays, and cluster routers in each computing cluster may depend on the computing workload or workloads assigned to each computing cluster.

Cluster storage arrays 610a, 610b, and 610c of computing clusters 609a, 609b, and 609c may be data storage arrays that include disk array controllers configured to manage read and write access to groups of hard disk drives. The disk array controllers, alone or in conjunction with their respective computing devices, may also be configured to manage backup or redundant copies of the data stored in the cluster storage arrays to protect against disk drive or other cluster storage array failures and/or network failures that prevent one or more computing devices from accessing one or more cluster storage arrays.

The cluster routers 611A, 611B, and 611C in the computing clusters 609a, 609b, and 609c may include networking equipment configured to provide internal and external communications for the computing clusters. For example, the cluster routers 611A in the computing cluster 609a may include one or more internet switching and/or routing devices configured to provide (i) local area network communications between the computing devices 600a and the cluster storage arrays 601A via the local cluster network 612a, and/or (ii) wide area network communications between the computing cluster 609a and the computing clusters 609b and 609c via the wide area network connection 613a to the network 606. The cluster routers 611B and 611C may include network equipment similar to the cluster routers 611A, and the cluster routers 611B and 611C may perform similar networking functions for the computing clusters 609b and 609b that the cluster routers 611A perform for the computing cluster 609a.

The systems and techniques presented herein detail a principled approach to the design of a WSC software stack. The applications of the systems and techniques may include a WSC design that improves the efficiency and utilization of WSCs. The WSC design may include an abstraction layer and an efficiency layer in the software stack of the WSC. The abstraction layer and the efficiency layer may be designed to improve job scheduling, simplify resource management, and drive hardware-software co-optimization using machine learning techniques and automation in order to customize the WSC for applications at scale. Such an autonomous WSC design may be used to autonomously measure, monitor, and characterize diverse workloads, to identify appropriate platforms to run the workloads, and to optimize and configure the hardware to realize the best performance for these workloads. In contrast to other approaches of configuring a WSC, the model, described herein, can operate at the CPU, machine or cluster granularity. For example, the model described herein can tune low level CPU configurations such as prefetcher settings and per-core Turbo Boost values, define and implement new QoS mechanisms for allocating shared hardware resources, and define and manage a new interface between cluster management software and available hardware resources within a cluster. In contrast to other machine learning approaches for use in WSCs, the autonomous WSC design described herein may enable characterization of WSC scale workloads using unsupervised machine learning techniques. Such an approach may provide intelligent resource management that automatically steers workloads to their best hardware platforms. Additionally, such an approach may enable dynamic hardware/software co-optimization to deliver the best performance for a given workload.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art.

Aspects of the present disclosure may be implemented as a computer implemented process, a system, or as an article of manufacture such as a memory device or non-transitory computer readable storage medium. The computer readable storage medium may be readable by a computer and may comprise instructions for causing a computer or other device to perform processes and techniques described in the present disclosure. The computer readable storage medium may be implemented by a volatile computer memory, non-volatile computer memory, hard drive, solid state memory, flash drive, removable disk, and/or other media. Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

The title of the present application and headings of sections provided in the present application are for convenience only, and are not to be taken as limiting the disclosure in any way.

Numerous examples are described in the present application, and are presented for illustrative purposes only. The described examples are not, and are not intended to be, limiting in any sense. One of ordinary skill in the art will recognize that the disclosed subject matter may be practiced with various modifications and alterations, such as structural, logical, software, and electrical modifications. It should be understood that the described features are not limited to usage in the one or more particular examples or drawings with reference to which they are described, unless expressly specified otherwise.

Devices that are described as in communication with each other may not be in continuous communication with each other, unless expressly specified otherwise. On the contrary, such devices may only transmit to each other as necessary or desirable, and may actually refrain from exchanging data most of the time. For example, a machine in communication with another machine via the Internet may not transmit data to the other machine for long periods of time, such as weeks at a time. In addition, devices that are in communication with each other may communicate directly or indirectly through one or more intermediaries.

The foregoing discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

The invention claimed is:

1. A method of scheduling a workload to be processed on one or more computer servers, the method comprising:
generating, by one or more processors, a performance profile for the workload using a first software layer;
classifying, by the one or more processors, the workload using a machine learning model based on the performance profile;
generating, by the one or more processors, a record of selected platforms for the workload based on the classification of the workload using the first software layer; and
scheduling, by the one or more processors, the workload for processing on a hardware layer based on the record of selected platforms for the workload using a second software layer.

2. The method of claim 1, wherein the one or more computer servers are associated with a warehouse-scale computer (WSC).

3. The method of claim 1, wherein the first software layer is a warehouse-scale computer (WSC) efficiency layer comprising at least one software module.

4. The method of claim 1, wherein the machine learning model performs a hierarchical agglomerative clustering technique to classify the workload.

5. The method of claim 4, wherein the hierarchical agglomerative clustering technique optimizes at least one of a cost value, an efficiency value, or a performance value associated with the workload.

6. The method of claim 1, wherein the second software layer is disposed between the first software layer and the hardware in a software stack of the one or more computer servers.

7. The method of claim 1, wherein the second software layer is a software-defined server (SDS) abstraction layer comprising one or more application programming interfaces (APIs) to directly access the hardware layer.

8. The method of claim 1, wherein the record of selected platforms indicates an order of preference for a set of hardware platforms of the hardware layer.

9. A system for scheduling a workload to be processed on one or more computer servers, the system comprising one or more processors configured to:
generate a performance profile for the workload using a first software layer;

classify the workload using a machine learning model based on the performance profile;

generate a record of selected platforms for the workload based on the classification of the workload using the first software layer; and schedule the workload for processing on a hardware layer based on the record of preferred selected platforms for the workload using a second software layer.

10. The system of claim 9, wherein the one or more computer servers are associated with a warehouse-scale computer (WSC).

11. The system of claim 9, wherein the first software layer is a warehouse-scale computer (WSC) efficiency layer comprising at least one software module.

12. The system of claim 9, wherein the machine learning model performs a hierarchical agglomerative clustering technique to classify the workload.

13. The system of claim 12, wherein the hierarchical agglomerative clustering technique optimizes at least one of a cost value, an efficiency value, or a performance value associated with the workload.

14. The system of claim 9, wherein the second software layer is disposed between the first software layer and the hardware in a software stack of the one or more computer servers.

15. The system of claim 9, wherein the second software layer is a software-defined server (SDS) abstraction layer comprising one or more application programming interfaces (APIs) to directly access the hardware layer.

16. The system of claim 9, wherein the record of selected platforms indicates an order of preference for a set of hardware platforms of the hardware layer.

17. A non-transitory computer-readable medium storing instructions for scheduling a workload to be processed on one or more computer servers that, when executed by one or more processors, cause the one or more processors to:

generate a performance profile for the workload using a first software layer;

classify the workload using a machine learning model based on the performance profile;

generate a record of selected platforms for the workload based on the classification of the workload using the first software layer; and schedule the workload for processing on a hardware layer based on the record of selected platforms for the workload using a second software layer.

18. The non-transitory computer-readable medium of claim 17, wherein the second software layer is disposed between the first software layer and the hardware in a software stack of the one or more computer servers.

* * * * *